B. B. Herrick,

Clothes Line Fastener.

No. 109,733. Patented Nov. 29, 1870.

Witnesses
H. H. Young
R. Montomery

Bryant B. Herrick
By David a Burr
Atty.

UNITED STATES PATENT OFFICE.

BRYANT B. HERRICK, OF DECATUR, MICHIGAN, ASSIGNOR OF ONE-HALF HIS RIGHT TO JOHN H. WALLACE, OF SAME PLACE.

IMPROVEMENT IN CLOTHES-LINE FASTENERS.

Specification forming part of Letters Patent No. 109,733, dated November 29, 1870.

*To all whom it may concern:*

Be it known that I, BRYANT B. HERRICK, of Decatur, in the county of Van Buren and State of Michigan, have invented certain Improvements in Clothes-Line Fasteners, of which the following is a specification.

My invention relates to the attachment of the pivoted cam or lever of my fastening device to an adjustable eccentric plate or disk, by means whereof the interval between the end of the cam and its stop or counter block may be changed and regulated at pleasure, to suit any thickness of cord or rope; and, also, to the combination of an arm and friction-roller with the counter-block, to facilitate the movement of the line or cord, prevent any wear thereof, and allow it to be extended at any desired angle without being disengaged from the fastener.

Figure 1:
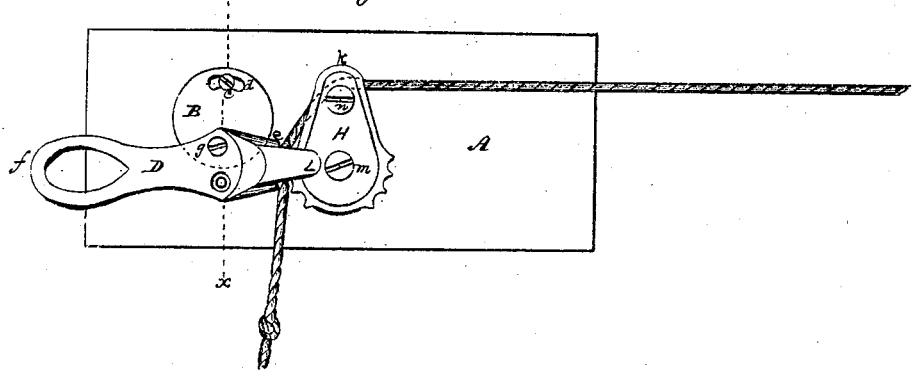
Figure 2:
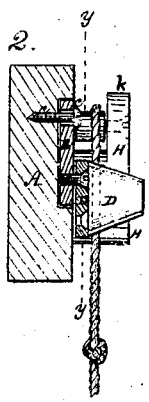
Figure 3:
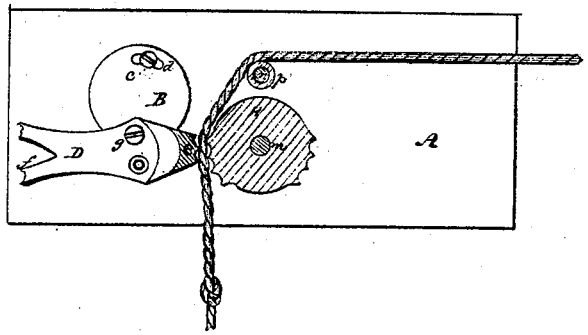

In the accompanying drawings, Figure 1 is an elevation of my improved device with the clothes-line thereby secured; Fig. 2, a transverse vertical section thereof, taken in the line $x\ x$ of Fig. 1; Fig. 3, a vertical longitudinal section in line $y\ y$ of Fig. 2.

A is a plate, upon which my fastening device is secured, and which may be attached by nails or screws to the corner of a house, a fence, post, or other suitable support.

B is a circular disk or wheel let into a circular recess in the plate A, and secured thereto by means of a pin or screw, $c$, passing through a concentrically-curved slot, $d$, cut in the disk near its edge, and which permits a partial revolution thereof, when the screw $c$ is loosened.

D is a pivoted lever, terminating at one end in a cam-head, $e$, and extended to form a handle, $f$, at the other, as illustrated in the drawings, Fig. 1. Its cam end $e$ is widened, and the wide front edge thereof is curved in an arc whose center is outside of the pivot-aperture upon which the lever swings. This pivot-aperture is pierced in the lever just in the rear of its cam end or head $e$, and through it passes a pivot-screw, $g$, by means whereof the lever is pivoted to the circular disk B at a point near its edge diametrically opposite the curved slot $d$ therein. The handle end $f$ of the lever overbalances the cam end $e$, so that the weight of the former has a tendency to throw the latter up toward its stop or counter.

H is the stop or counter block of the device. It is made cylindrical in form, but is provided with an arm, $k$, on its outer face, projecting above its cylindrical body, as shown in the drawings, Fig. 3, also Figs. 1 and 2. This counter-block H is secured to the plate A in position slightly in front of the cam $e$, and so that the center of its cylindrical body shall be slightly below a horizontal plane passing through the pivot of the lever D, the arm $k$ of the counter being made to project upward, as shown in Fig. 1. It is thus fastened by means of a screw, $m$, passing centrally through its cylindrical portion, and a second screw, $n$, passing through its arm $k$. A friction-roller, $p$, is placed upon the shank of the screw $n$, between the arm $k$ and plate A, so as to revolve freely upon its axis. The counter H is thus placed in such relation to the cam end of the swinging lever D as that the latter may barely come into contact with the side of the former when swung up toward it, the proximity of the two surfaces being increased or decreased by a partial revolution of the disk B in one direction or the other. The opposite surfaces of the cam $e$ and counter H are serrated, so as to afford a better hold thereof upon the interposed cord or line. A guard-finger, L, projects from the outer end of the cam $e$ over the outer face of the counter-block H, to prevent the cord or line from working or slipping out laterally.

To fasten the end of a clothes-line with my device, the cam $e$ is thrown down entirely clear of its counter H by simply lifting the longer arm or handle $f$ of the lever D, so as to leave a wide open interval between the cam and counter. The end of the line is then passed over the friction-roller $p$, and carried down between the cam $e$ and counter H under the finger L, so that so soon as the handle $f$ is released its weight will force up the cam $e$ and the line lying thereon against the counter H, and thus securely fasten it. As the eccentricity of the cam causes it to act as a wedge against the counter, the greater the strain upon the line the tighter will it be held. The serrated surfaces of the cam and counter prevent any possibility of the line slipping through between them. The finger L prevents it from working out therefrom laterally, and the projecting arm $k$ prevents it from sliding off of the roller $p$, and allows it to be extended therefrom at any angle without danger of detachment. To release the line it is only necessary to lift the handle $f$ of the lever.

The cam-lever D may be made to work on the right of the counter H, instead of on the left, as illustrated in the drawings, by simply transferring it to the other side and changing the location of its pivot from one side of the center to the other. To facilitate such a change a second pivot-hole, $r$, is formed in the lever D, and both sides of the counter are serrated, as shown in Fig. 3.

I do not claim as new in my device a pivoted cam or eccentric working against a fixed counter or stop.

I claim as my invention—

1. A cam, $e$, working against a fixed counter, H, when said cam is pivoted to a plate or disk having a partial movement upon an eccentric pivot, $c$, whereby the interval between the cam and its counter may be increased or decreased at pleasure, substantially as and for the purposes herein set forth.

2. The combination of the projecting arm $k$ and friction-roller $p$ with the fixed counter H and swinging cam $e$, substantially as and for the purpose herein set forth.

Witness my hand hereto.

BRYANT B. HERRICK.

In presence of—
JOHN H. WALLACE,
NEWTON FOSTER.